United States Patent
Hashimoto et al.

(10) Patent No.: US 10,637,322 B2
(45) Date of Patent: Apr. 28, 2020

(54) BRUSHED MOTOR

(71) Applicant: MABUCHI MOTOR CO., LTD., Matsudo, Chiba (JP)

(72) Inventors: Yasuhiro Hashimoto, Chiba (JP); Hideyuki Uzawa, Chiba (JP); Yasuhiro Yamagata, Chiba (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 0 days.

(21) Appl. No.: 15/987,767

(22) Filed: May 23, 2018

(65) Prior Publication Data

US 2018/0358862 A1 Dec. 13, 2018

(30) Foreign Application Priority Data

Jun. 13, 2017 (JP) ................................. 2017-116080

(51) Int. Cl.
| | |
|---|---|
| *H02K 5/14* | (2006.01) |
| *H02K 13/00* | (2006.01) |
| *H02K 9/06* | (2006.01) |
| *H01R 39/26* | (2006.01) |
| *H02K 3/487* | (2006.01) |

(52) U.S. Cl.
CPC .............. *H02K 5/148* (2013.01); *H02K 9/06* (2013.01); *H02K 13/006* (2013.01); *H01R 39/26* (2013.01); *H02K 3/487* (2013.01)

(58) Field of Classification Search
CPC .......... H02K 9/06; H02K 5/148; H02K 13/06; H02K 13/006; H01R 39/26
USPC .................................................. 310/62, 214
See application file for complete search history.

(56) References Cited

U.S. PATENT DOCUMENTS

| | | | | |
|---|---|---|---|---|
| 5,449,963 | A | * 9/1995 | Mok ........................ | H02K 3/38 310/270 |
| 2009/0126184 | A1 * | 5/2009 | Smith ...................... | H02K 3/44 29/597 |
| 2015/0076954 | A1 * | 3/2015 | Johnson ................. | H02K 3/487 310/214 |

FOREIGN PATENT DOCUMENTS

| | | |
|---|---|---|
| JP | H06284618 A | 10/1994 |
| JP | H11187601 A | 7/1999 |
| JP | 2001309615 A | 11/2001 |
| JP | 2006211758 A | 8/2006 |

OTHER PUBLICATIONS

Chinese Office Action dated Nov. 21, 2019 (and English translation thereof) issued in Chinese Application No. 201810594579.7.

* cited by examiner

*Primary Examiner* — Terrance L Kenerly
(74) *Attorney, Agent, or Firm* — Myers Wolin, LLC.

(57) ABSTRACT

Provided is a brushed motor in which noise in a high rotational speed range is effectively decreased. A bar-shaped flat attachment 28 of synthetic resin is inserted along an axial line L into an opening of a slot 16 formed in a core 14 of a rotor 7, and fixed with respect to the core 14 and/or windings 17 using adhesive agent. The flat attachment 28 has side surfaces 28*b* and an inner peripheral surface 28*c*. The side surfaces 28*b* are engaged from an inner peripheral side with inclined surfaces 15*a* of teeth 15 adjacent to each other across the opening of the slot 16. The inner peripheral surface 28*c* of the flat attachment 28 has two ridges 28*d* protruding therefrom which are abutted against the windings 17. The flat attachment 28 closes the opening of the slot 16 and shapes an outer peripheral surface 14*a* of the core 14 into a flat cross sectional shape suitable for suppression of wind noise.

5 Claims, 9 Drawing Sheets

OUTER PERIPHERAL DEPTH D

BRUSHED MOTOR

BACKGROUND

1. Technical Field

The present invention relates to a brushed motor in which an armature including a core with windings wound thereon is disposed on a rotary shaft, the armature being electrically fed by means of brushes slidably engaged with a commutator on the rotary shaft.

2. Description of the Related Art

A brushed motor of this type includes a stator and a rotor which are disposed in a housing. The stator includes a field magnet fixed on an inner peripheral surface of the housing. The rotor includes an armature disposed on a rotary shaft rotatably supported in the housing. The armature has a core with windings for respective poles wound thereon. The windings for the poles are electrically connected to a commutator. The commutator has an outer peripheral surface with which brushes are slidably engaged to supply power to the armature. The direction of electric current flowing through the windings is successively reversed to vary the magnetic fields between the windings and the field magnet, thereby rotating the rotor.

Small, inexpensive, and high-efficiency brushed permanent magnet motors are being widely used for various applications. However, the structure in which the brushes are slidably engaged with the outer peripheral surface of the commutator, and in which the rotor having the windings disposed in the grooves between salient poles of the core is rotated leaves room for improvement in terms of quietness during operation. Accordingly, various proposals have been made.

For example, JP-A-2001-309615 discloses a brushed motor in which a brush holder made of sheet metal for holding the brushes is formed with reinforcement ribs and has a two-fold double structure for increased stiffness. In this way, vibrations at the distal end of the brushes when slidably engaged with the commutator are suppressed to reduce noise.

JP-A-2006-211758 discloses a brushed motor in which a vibrator is configured by fixing, via an elastic body, a substantially dice-shaped weight to the distal end of a brush holder for holding a brush. Vibrations caused in the brush holder are transmitted to the weight and dissipated in the form of vibration energy, thereby reducing the vibration of the brush holder and hence noise.

SUMMARY

As a means for expanding the application of brushed motors, high rotation types have been developed. These motors have overcome various obstacles to achieving higher speed rotation, and their practical rotational speed ranges are becoming gradually higher.

However, as shown in FIG. 6 indicating the results of a noise test, compared with a normal rotational speed range (such as less than 20,000 rpm), an increase in noise in a high rotational speed range achieved by an increase in rotational speed is unavoidable. Even when the countermeasures described in JP-A-2001-309615 and JP-A-2006-211758 are adopted during the development of high rotation motors, the decrease in noise achieved in the high rotational speed range has been insufficient.

The present invention has been made to solve the above problems, and an object of the present invention is to provide a brushed motor in which the noise in a high rotational speed range is effectively decreased.

In order to achieve the purpose, a brushed motor of the present invention includes: a housing; a field magnet disposed on an inner peripheral surface of the housing; a rotor including a core, a rotary shaft rotatably supported in the housing, and a commutator disposed on the rotary shaft, the core having a plurality of teeth circumferentially arranged about an axial line of the rotary shaft, and a slot formed between the teeth, the slot having an opening on an outer peripheral side of the core and extending in an axial line direction of the core, the rotor further including a winding wound on each of the teeth in the slot; a brush slidably engaged with an outer peripheral surface of the commutator to supply power to the winding; and a shape complementing member molded from an insulating material, the shape complementing member being inserted and fixed into the opening in the slot of the core from the axial line direction of the core.

In the brushed motor thus configured, the slot opening onto the outer peripheral surface of the core has a cross sectional shape recessed from the outer peripheral surface of the core even after the windings are wound. In addition, the opening extends throughout in the axial line direction of the core. These provide a potential cause of significant wind noise. In the present invention, the shape complementing member molded from insulating material is inserted and fixed into the opening of the slot. Because the opening in the slot is closed by the shape complementing member, the outer peripheral surface of the core is shaped into a cross sectional shape with increased flatness. Thus, the wind noise due to the slot during motor operation, and further the noise of the motor are reduced.

In a preferred embodiment, the shape complementing member may have an outer peripheral surface which is recessed with respect to an outer peripheral surface of the core in a radius direction of the core about the rotary shaft, the recess having a depth set in a range of from 0 to 1.5 mm.

In the brushed motor thus configured, as indicated by the test results shown in FIG. 8, while a satisfactory noise reduction effect is obtained at the depth of 1.5 mm, the noise sharply increases at 3.0 mm. This indicates that the upper limit of an optimum range of the depth is 1.5 mm. Meanwhile, protrusion of the outer peripheral surface of the shape complementing member beyond the outer peripheral surface of the core should be avoided. Accordingly, the optimum range of the depth is identified to be from 0 to 1.5 mm.

In a preferred embodiment, the slot and the shape complementing member may each have a length in the axial line direction of the core along the rotary shaft, and a ratio of the length of the shape complementing member to the length of the slot is set in a range of from 50 to 100%.

In the brushed motor thus configured, as indicated by the test results shown in FIG. 7, the noise hardly increases when the ratio is decreased from 75% to 50%. Thus, the lower limit of the optimum range of the ratio may be considered 50%. Meanwhile, lengths of the shape complementing member exceeding the length of the core are meaningless. Accordingly, the optimum range of the ratio is identified to be from 50 to 100%.

In a preferred embodiment, in the slot, the shape complementing member may be engaged with the windings wound on the teeth so as to be biased in an outer peripheral direction, and may be engaged with inner surfaces of the teeth extending on both sides of the opening of the slot.

In the brushed motor thus configured, the shape complementing member is engaged with the windings wound on the teeth and is thereby biased in the outer peripheral direction. The shape complementing member is also engaged with the inner surfaces of the teeth extending on both sides of the opening of the slot. Thus, the shape complementing member is held in a predetermined position in the opening of the slot. As a result, the outer peripheral surface of the core and the outer peripheral surface of the shape complementing member are maintained in a predetermined positional relationship, making it possible to perform even more reliable reduction of noise.

In a preferred embodiment, the brushed motor may further include a cooling fan having an annular shape about the rotary shaft and disposed at an end in the axial line direction of the core. The cooling fan may be connected with one end of the shape complementing member and integrally formed with the shape complementing member, the cooling fan being supported from the core via the shape complementing member.

In the brushed motor thus configured, during the assembly of the motor, as the shape complementing member is inserted and fixed into the opening of the slot along the axial line direction, the cooling fan is necessarily disposed in a regular position with respect to the core, and is supported from the core via the shape complementing member. Thus, a plurality of shape complementing members can be inserted and fixed into a plurality of slots at once, while the cooling fan is also supported in the regular position. Accordingly, the assembly operation is simplified.

In a preferred embodiment, the cooling fan may include: an annular base member and a plurality of fins circumferentially arranged on an anti-core side of the base member; and the one end of the shape complementing member may be connected to the base member at a position circumferentially aligned with any of the fins of the cooling fan.

In the brushed motor thus configured, one end of the shape complementing member is circumferentially aligned with any of the fins of the cooling fan, so that the shape complementing member and the fin are directly connected across the base member. As a result, the shape complementing member, the base member, and the fin together function as a single stiff body continuous in the axial line direction. Thus, the rotation of the rotor can be reliably transmitted to the cooling fan without damage.

According to the brushed motor of the present invention, the noise in a high rotational speed range can be effectively decreased.

DESCRIPTION OF THE EMBODIMENTS

First Embodiment

In the following, a first embodiment of a brushed motor of the present invention will be described.

Figure 1:
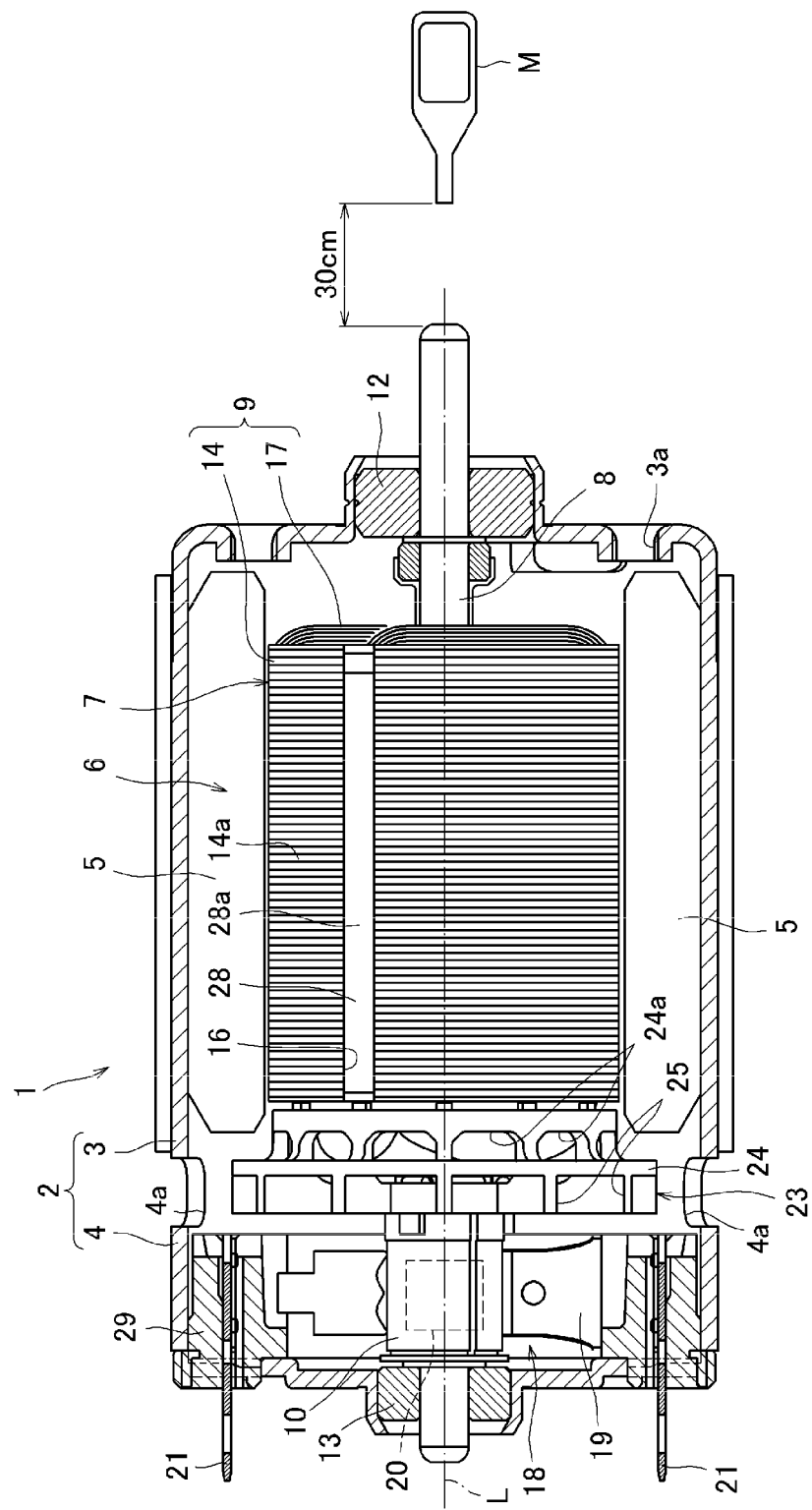
FIG. 1 is a cross sectional view of a brushed motor according to a first embodiment.
Figure 2:
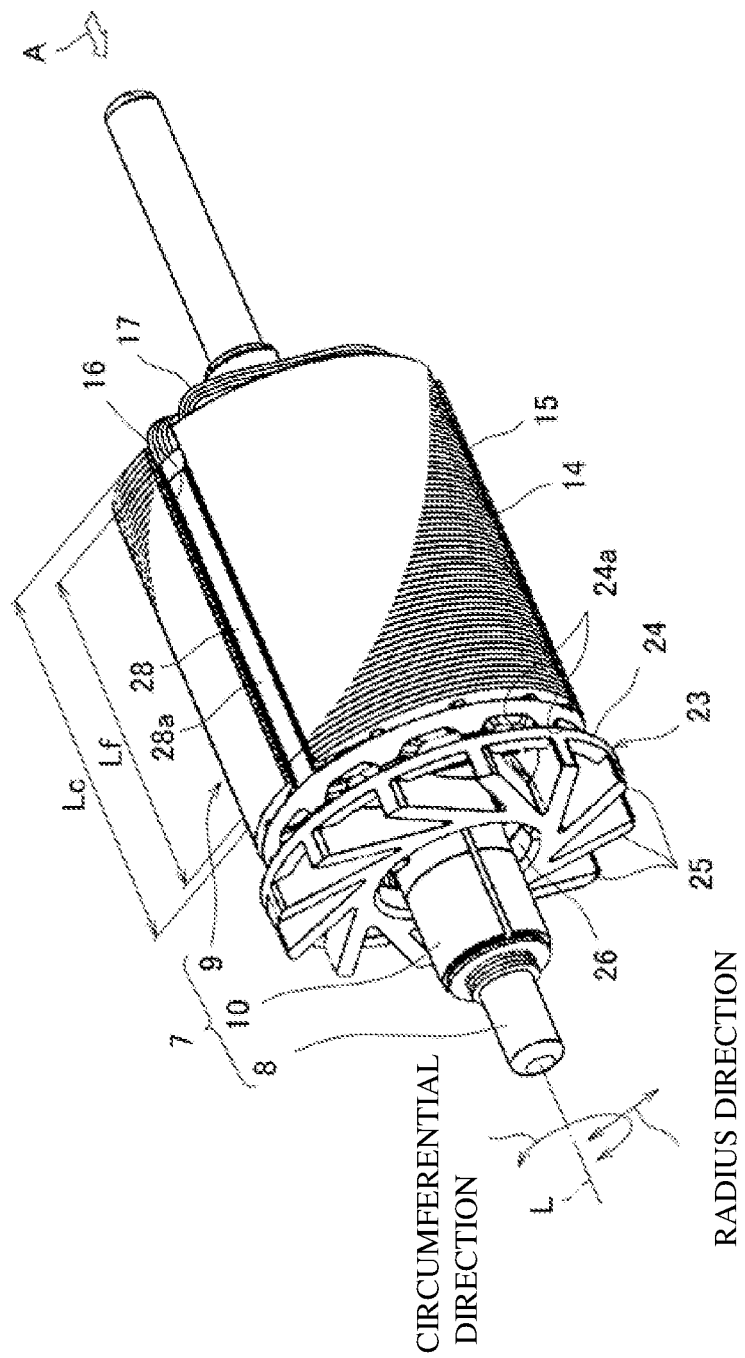
FIG. 2 is a perspective view of a rotor and a cooling fan of the brushed motor.
Figure 3:
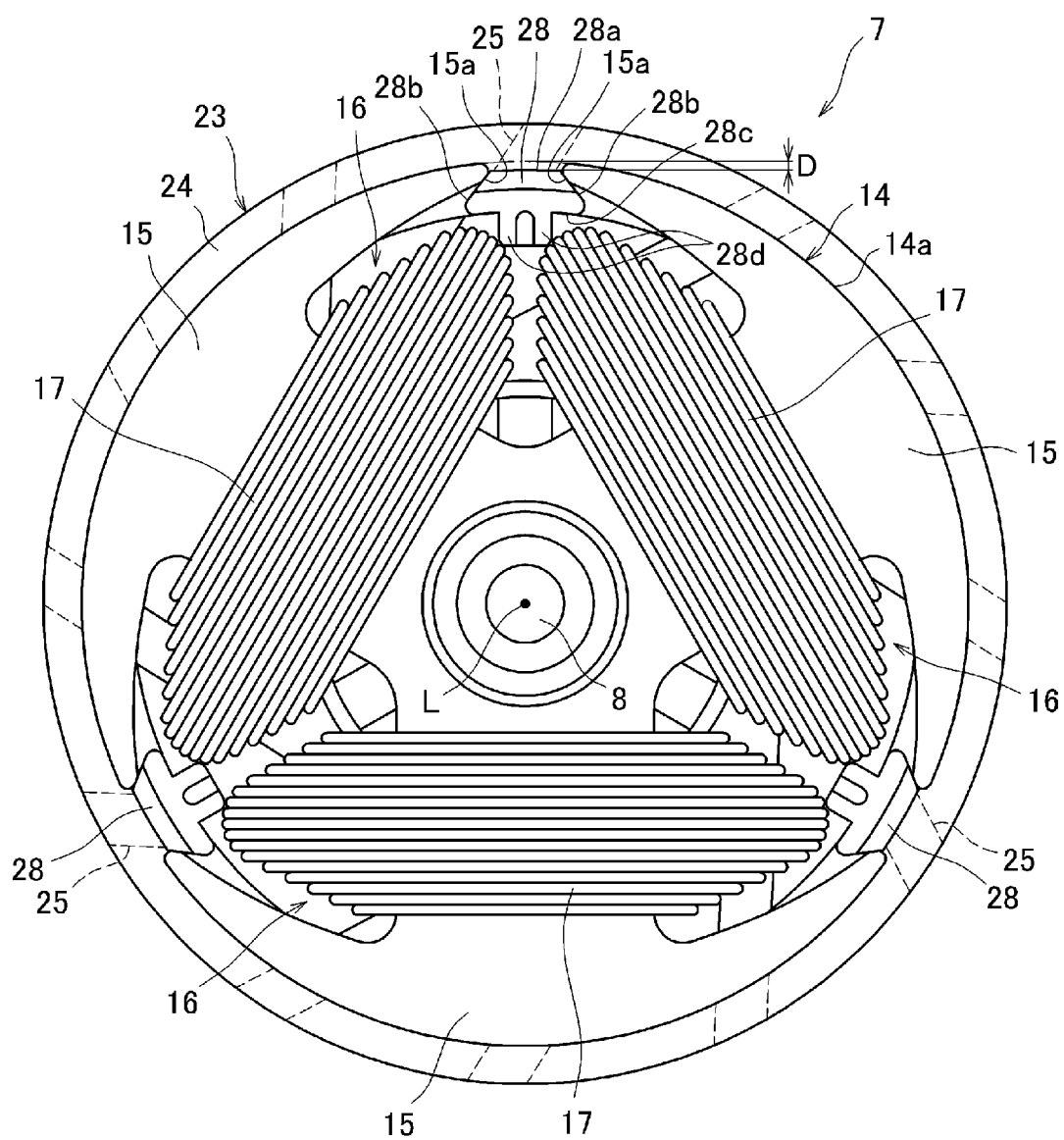
FIG. 3 is a view along arrow A of FIG. 2, illustrating the rotor and the cooling fan of the brushed motor.

FIG. 1 is a cross sectional view of the brushed motor of the present embodiment. FIG. 2 is a perspective view of a rotor and a cooling fan of the brushed motor. FIG. 3 is a view along arrow A of the rotor and the cooling fan of the brushed motor of FIG. 2. In FIG. 1, the right side corresponds to the front side of the motor, and the left side corresponds to the rear side of the motor.

The motor 1 has a housing 2 which includes a metal case 3, a brush holder 29 made from synthetic resin, and an end bell 4 made from metal. The metal case 3 has a cylindrical cup shape with an opening toward the rear side. The end bell 4 is attached to close the opening. The end bell 4 is mated with a step formed at the opening of the metal case 3, and is fixed in place by swaging as the end bell 4 is sandwiched between the step and a part of the metal case 3 that has been cut and bent.

On the inner peripheral surface of the metal case 3, two-pole field magnets 5 are fixed by means of a metal spring and adhesive agent, which are not illustrated. The field magnets 5 and the metal case 3, which functions as a yoke, constitute a stator 6. Inside the field magnets 5, a rotor 7 is disposed. The rotor 7 includes a rotary shaft 8, an armature 9, and a commutator 10.

The front side of the rotary shaft 8 of the rotor 7 is rotatably supported by a bearing 12 in the metal case 3. The rear side of the rotary shaft 8 is rotatably supported by a bearing 13 in the end bell 4. The rotary shaft 8 includes an extension protruding out of the metal case 3 on the front side, the extension functioning as an output shaft of the motor 1.

The armature 9 includes a core 14 made of a stack of a plurality of laminated silicon steel sheets. As illustrated in FIG. 3 in particular, the core has three rows of teeth 15 circumferentially arranged side by side about an axial line L of the rotary shaft 8, forming a substantially cylindrical shape. The teeth 15 are connected at the center, with both sides at the outer peripheral end of each tooth extending circumferentially, forming a T-shaped cross section. Between the teeth 15, slots 16 are formed extending along the axial line L of the core 14, each of the slots 16 having one side opening to an outer peripheral surface 14a (as illustrated in FIG. 3) of the opening core 14.

Due to the extensions at the outer peripheral ends of adjacent teeth 15, each of the slots 16 has a sac-like cross section with a narrowed opening at the outer peripheral surface 14a of the core 14. After the core 14 is entirely provided with insulating coating, the teeth 15 are wound with windings 17 in the respective slots 16, forming a plurality of coils and the armature 9.

As illustrated in FIG. 1, a predetermined clearance is formed between the outer peripheral surface 14a of the core 14 and the inner peripheral surface of the field magnets 5. The commutator 10 is disposed on the rotary shaft 8 and positioned within the end bell 4. The commutator 10 is circumferentially divided into three poles and electrically connected, not illustrated, to the respective poles of the windings 17.

In the end bell 4, a brush holder device 18 is disposed so as to internally hold the commutator 10. The configuration of the brush holder device 18 is similar to that of well-known brush holders, and its detailed description will be omitted.

At 180° opposed positions about the center of the commutator 10, a pair of brushes 20 (of which only one is illustrated) supported at the distal ends of brush arms 19 is disposed. The brushes 20 are engaged with the outer peripheral surface of the commutator 10 due to elasticity of the brush arms 19. At the proximal ends of the brush arms 19, terminals 21 are integrally formed. The terminals 21 protrude out of the end bell 4 and are configured for connection with power supply cables, which are not illustrated.

As power is supplied to the terminals 21 via the power supply cables, electric current flows via the brush arms 19, the brushes 20, and the commutator 10 to the windings 17 forming the plurality of coils of the armature 9, whereby magnetic fields are generated in the core 14. As a result, the rotor 7 rotates, and each of the brushes 20 is successively slidably engaged with one or two of the divided sections of the outer peripheral surface of the commutator 10. Accordingly, the coils of the armature 9 that are energized and the direction of the electric current flowing through each of the coil are successively switched, whereby the magnetic fields between the core 14 and the field magnets 5 are varied, causing the rotor 7 to keep rotating.

Figure 4:
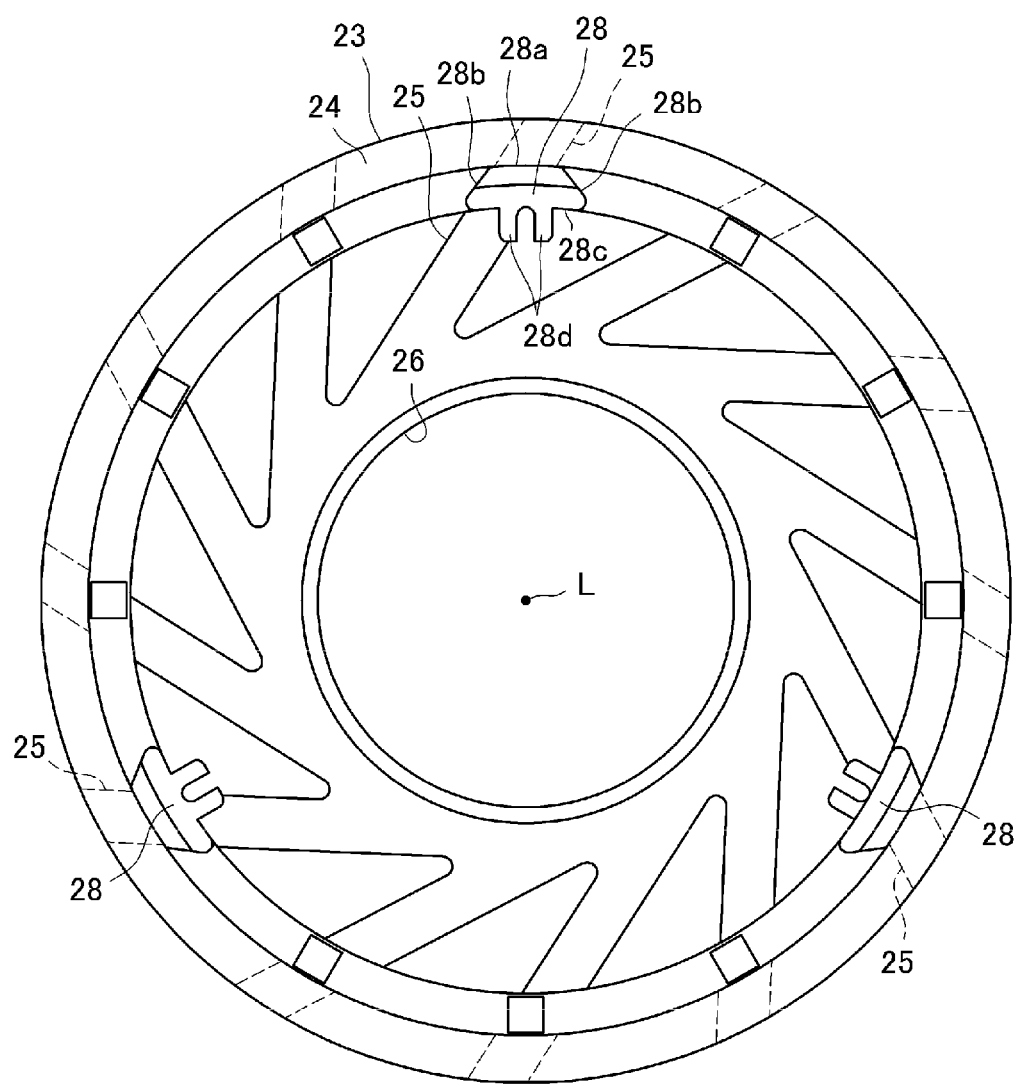
FIG. 4 is a view along arrow A of FIG. 2, illustrating the cooling fan and flat spacers of the brushed motor.

FIG. 4 is a view along arrow A of FIG. 2, illustrating a cooling fan and a flat attachment of the brushed motor 1.

As illustrated in FIGS. 1, 2, and 4, the cooling fan 23 is disposed at the rear-side end in the direction of the axial line L of the core 14. The cooling fan 23 as a whole has an annular shape with the rotary shaft 8 at the center. The cooling fan 23 includes an annular base member 24 with a number of lightening holes 24a formed in an outer peripheral surface thereof. The cooling fan 23 also includes a number of fins 25 arranged on a rear side surface (anti-core side) of the base member 24. The members 24 and 25 are integrally formed from synthetic resin material.

The central sides of the fins 25 are connected with each other and form a circular hole 26 through which the rotary shaft 8 is passed. The outer peripheral sides of the fins 25 are connected to the base member 24 and integrated with each other. The gaps between the fins 25 are continuous with the spaces in the direction of the axial line L.

The cooling fan 23 configured as described above is adhered to the rear-side end face of the core 14 with adhesive agent, and is rotated integrally with the rotor 7. During rotation of the cooling fan 23, air is ejected by the fins 25 from the central side toward the outer peripheral side. The air then passes through outlet holes 4a formed in the end bell 4 and is discharged externally. Accordingly, the rotor 7 and the windings 17 are cooled by air that flows into the housing 2 via inlet holes 3a formed in the metal case 3. Also, the commutator 10 and the brushes 20 are cooled by air that flows into the housing 2 via inlet holes, not illustrated, in the end bell 4.

According to the present embodiment, the motor 1 is adapted for high-speed rotation where the practical rotational speed range has an upper limit of 40,000 rpm. Accordingly, the amount of heat generated due to the energization of the windings 17 and the brushes 20, and the amount of heat generated due to electric resistance and slide friction where the brushes are slidably engaged with the commutator 10 are both large. However, due to the cooling effect provided by the cooling fan 23, temperature increases in the core 14 and the windings 17 are suppressed, and the slidably engaged portions including the brushes 20 are also cooled and their temperature increases are suppressed. Thus, wearing of the brushes 20 due to their sliding engagement is also effectively suppressed.

As discussed above with reference to FIG. 6 illustrating the results of noise tests, an increase in the practical rotational speed range of the brushed motor 1 leads to an increase in noise in the high rotation rotational speed range. With the countermeasure techniques proposed in JP-A-2001-309615 and JP-A-2006-211758, it has been unable to obtain sufficient noise reduction effect.

In view of the above problem, the present inventors have discovered that the increase in the noise in a high rotational speed range is mainly due to the wind noise generated by the slots 16 formed in the outer peripheral surface 14a of the core 14, and devised a countermeasure. The process of analysis leading to the conclusion will be discussed below.

It can be considered that the countermeasure described in JP-A-2001-309615 for increasing the brush holder stiffness by means of reinforcement ribs, and the countermeasure described in JP-A-2006-211758 for dissipating the vibration of the brush holder by means of a vibrator both act to suppress the vibrations of the brushes. Accordingly, the noise due to the sliding engagement of the brushes should be reduced. However, there is still an increase in noise in the high rotational speed range. This indicated the possibility that there are causes other than the sliding engagement of the brushes.

As one major source of noise for the increase in the high rotational speed range of the motor 1, the wind noise of the rotor 7 rotating in the housing 2 was considered. As a result of an analysis of the shape of various parts of the rotor 7, it was concluded that the slots 16 in the outer peripheral surface 14a of the core 14 were the parts with a shape that most easily caused wind noise.

In the first place, the slots 16 have the sac-like cross section with one side opening onto the outer peripheral surface 14a of the core 14. Even after the windings 17 are wound on the teeth 15, the slots 16 still have a cross sectional shape which is significantly recessed from the outer peripheral surface 14a of the core 14, the openings extending throughout in the direction of the axial line L of the core 14. Thus, the slots 16 provide a cause for significant wind noise. However, the slots 16 are an indispensable requirement in the brushed motor 1 to allow for the windings 17 to be wound on the teeth 15 of the core 14. The slots 16 in the outer peripheral surface 14a of the core 14, therefore, are unavoidable.

In addition, the wind noise due to the slots 16 is also generated in a normal rotational speed range in a less pronounced manner than in the high rotational speed range. And there was the conventional knowledge that the brushed motor 1 having the winding slots generated greater noise than a brushless motor provided with a rotor having, e.g., a ring magnet without outer peripheral irregularities, the knowledge being suggestive of the fact that the noise was due not only to the sliding engagement of the brushes 20 but also to the wind noise generated by the slots 16. Accordingly, it was contemplated that the suppression of the wind noise due to the slots 16 would provide a significant effect for reducing noise not only in the high rotational speed brushed motor 1 of the present embodiment but also in brushed motors having normal rotational speed ranges.

Based on the above knowledge, in the present embodiment, the wind noise due to the slots 16 is countered by means of a flat attachment (shape complementing member) disposed in each of the slots 16 of the rotor 7, as described in detail below.

Figure 5:
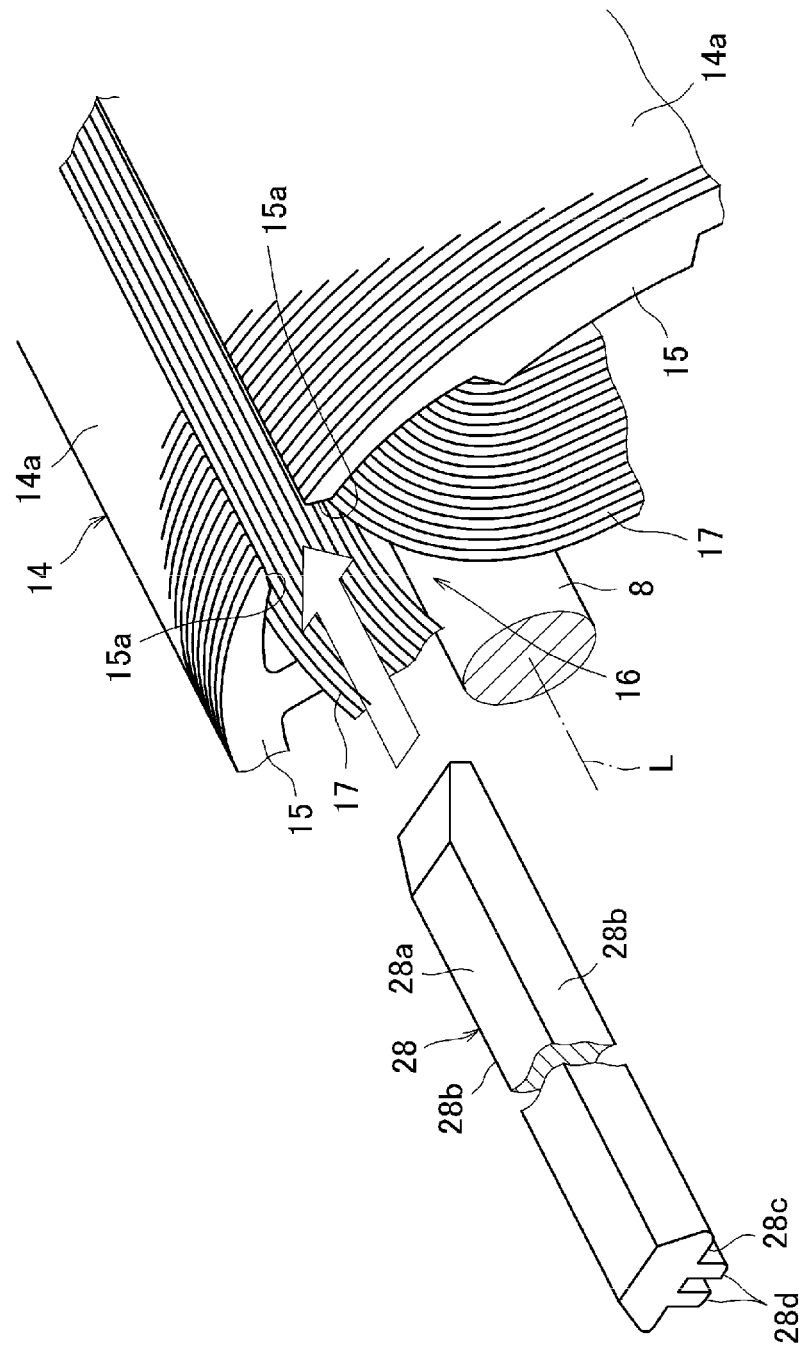
FIG. 5 is a perspective view illustrating a flat spacer being inserted into a slot.

FIG. 5 is a perspective view of a flat attachment 28 being inserted into a slot 16.

In simple terms, the flat attachment 28, by being disposed in the opening of each of the slots 16, provides the function of closing the opening and shaping the outer peripheral surface 14a of the core 14 into a cross sectional shape with increased flatness.

The flat attachment 28 is made by injection molding an insulating and non-magnetic material, such as synthetic resin material, into a generally bar shape corresponding to the opening of the slots 16. As indicated by an arrow in FIG. 5, the flat attachment 28 is inserted into the opening in the slot 16 from the rear side in the direction of the axial line L, and is fixed with respect to the core 14 and/or the windings 17 using adhesive agent.

The inside of the slot 16 formed of the core 14 that is a silicon steel sheet laminated body has a succession of minute depths in the direction of the axial line L. Accordingly, to enable smooth insertion of the flat attachment 28, the distal end in the insertion direction of the outer peripheral surface 28a is tapered. As illustrated in FIG. 2, in the direction of the axial line L of the core 14, the flat attachment 28 has a length Lf which is slightly shorter than a length Lc of the core 14, and the ratio Lf/Lc is set to 96.6% in the present embodiment.

The cross sectional shape of the flat attachment 28 will be described. As illustrated in FIG. 3, the flat attachment 28 has a generally trapezoidal cross section. The flat attachment 28 has an outer peripheral surface 28a which, corresponding to the upper base of the trapezoid, has an arc shape with the same curvature as that of the outer peripheral surface 14a of the core 14. The flat attachment 28 has a width slightly wider than the width (interval at the extending portions of the teeth 15) of the slots 16. The shape of the outer peripheral surface 28a is not limited to the illustrated example, and may be planar, for example.

At the ends of the extending portions of the adjacent teeth 15 across the opening of the slot 16, inclined surfaces 15a (inner surfaces) facing each other and also facing the inner peripheral side of the core 14 are formed. Specifically, the inclined surfaces 15a are inclined so as to be increasingly spaced apart from each other toward the inner peripheral side of the core 14. The inclined surfaces 15a are set with a preferable shape for winding the windings 17 and generating the magnetic field. The flat attachment 28 has side surfaces 28b, corresponding to the legs of the trapezoid. The side surfaces 28b are inclined so as to respectively correspond to the inclined surfaces 15a. The side surfaces 28b are engaged with the inclined surfaces 15a from the inner peripheral side of the core 14.

The flat attachment 28 has a flat inner peripheral surface 28c, corresponding to the lower base of the trapezoid. On the inner peripheral surface 28c, two ridges 28d are formed at a circumferential interval from each other and extending throughout the core 14 in the direction of the axial line L. The ridges 28d respectively abut the windings 17 wound on the adjacent teeth 15 in the slots 16. Accordingly, the flat attachment 28 is biased in an outer peripheral direction, whereby the inclined side surfaces 28b are abutted against the inclined surfaces 15a at the extending portions of the teeth 15, as described above.

As a result, the flat attachment 28 is sandwiched between the windings 17 and the inclined surfaces 15a of the teeth 15 in the opening of the slot 16. The ridges 28d are slightly elastically deformed to regulate the positional displacement of the flat attachment 28 in the direction of the axial line L, the radius direction, and the circumferential direction. The engagement of the side surfaces 28b with the inclined surfaces 15a of the teeth 15 enables the flat attachment 28 to sufficiently resist large centrifugal force in the high rotational speed range.

Thus, the opening of the slot 16 is closed by the flat attachment 28. In this case, the width of the outer peripheral surface 28a of the flat attachment 28 is slightly larger than the width of the slot 16. Accordingly, the outer peripheral surface 28a of the flat attachment 28 is slightly recessed with respect to the outer peripheral surface 14a of the core 14 in the radius direction of the core 14, and a depth D of the recess is set to 0.4 mm in the present embodiment.

The present inventors conducted a noise test on the brushed motor 1 configured as described above according to the present embodiment.

Figure 6:
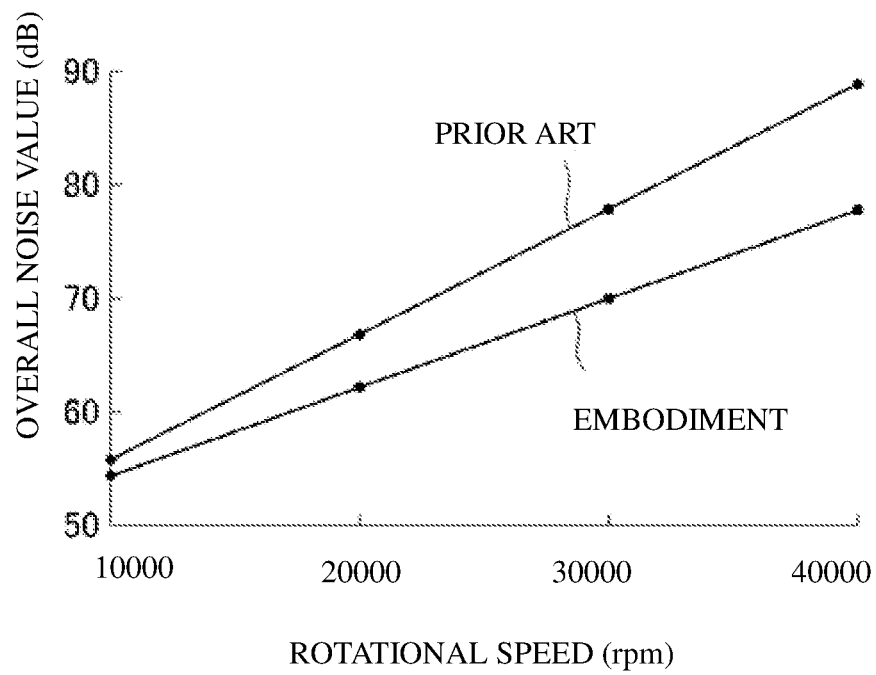
FIG. 6 is a chart illustrating the results of noise tests performed on the brushed motor of the embodiment and a brushed motor according to conventional technology.

During the noise test, as illustrated in FIG. 1, a measurement device M was disposed at a distance of 30 cm from the front side of the motor 1, and the noise (JIS C 1502-A characteristics; overall value) generated from the motor 1 during operation at various rotational speeds was measured. FIG. 6 is a chart illustrating the results of the noise test performed on the brushed motor 1 of the embodiment and a brushed motor according to conventional technology (adapted for high speed rotation but not including the flat attachment 28).

As shown in the chart, in the present embodiment, the noise, while increasing as the rotational speed increases, is sufficiently reduced compared with the conventional technology. The noise reduction effect is more pronounced in higher rotational speed ranges. For example, at 40,000 rpm, the noise is greatly reduced from the approximately 89 dB of the conventional technology down to approximately 78 dB. It can also be estimated from the test results that a sufficient noise reduction effect can be obtained when the flat attachment 28 of the present embodiment is applied in a conventional brushed motor in a normal rotational speed range (such as less than 20,000 rpm).

As described above, the only difference in motor specifications between the present embodiment and the conventional technology is the presence or absence of the flat attachment 28. Accordingly, the fact that the noise reduction effect was obtained by means of the flat attachment 28 can be considered to prove that the main cause of an increase in the noise in the high rotational speed range is the wind noise generated by the slots 16 in the outer peripheral surface 14a of the core 14. Thus, in the brushed motor 1 of the present embodiment, by suppressing the wind noise due to the slots 16, the noise in all of the rotational speed ranges including high rotational speed range can be effectively decreased.

Meanwhile, the present inventors, with a view to identifying the optimum range of the rate Lf/Lc of the length Lf of the flat attachment 28 to the length Lc of the core 14, and the optimum range of the depth D between the outer peripheral surface 14a of the core 14 and the outer peripheral surface 28a of the flat attachment 28, conducted a noise test in which the ratio Lf/Lc and the depth D were gradually varied by using different specifications of the flat attachment 28.

The noise test for the ratio Lf/Lc was conducted with respect to four ratios of Lf/Lc of 100%, 75%, 50%, and 0% with the depth D fixed at 0.4 mm.

Figure 7:
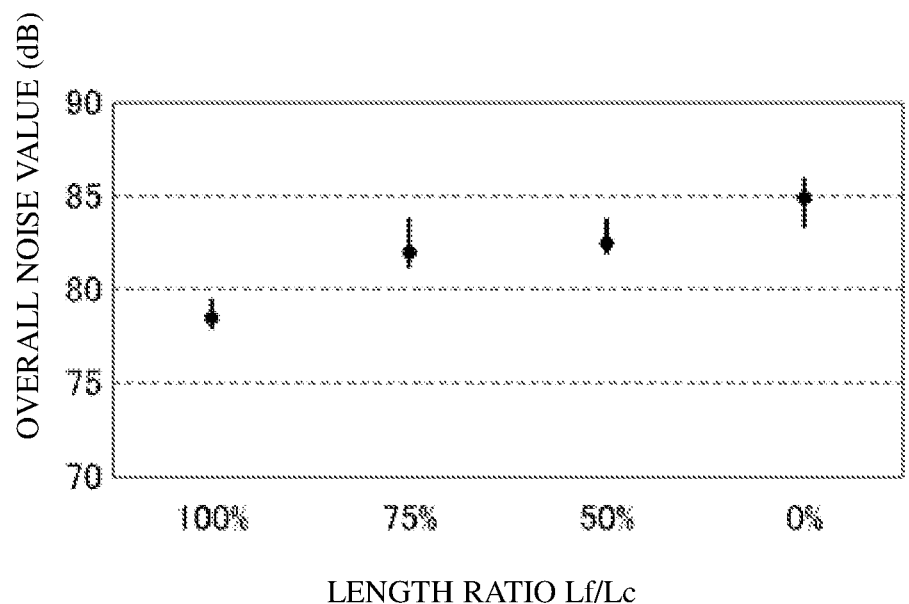
FIG. 7 is a chart illustrating the results of a noise test in which a rate Lf/Lc was changed.

As indicated by the test results shown in FIG. 7, the overall tendency was that while the noise increased as the ratio Lf/Lc was decreased (i.e., the length Lf of the flat attachment 28 was decreased), the noise hardly increased when the ratio Lf/Lc was decreased from 75% to 50%. Thus, it can be considered that the lower limit of the optimum range of the ratio Lf/Lc is 50%. Since the length Lf of the flat attachment 28 in excess of the length Lc of the core 14 is meaningless, the optimum range of the ratio Lf/Lc can be identified as being 50 to 100%.

The noise test for the depth D was conducted with respect to three depths D of 1.5 mm, 3.0 mm, and 5.0 mm with the ratio Lf/Lc fixed at 100%.

Figure 8:
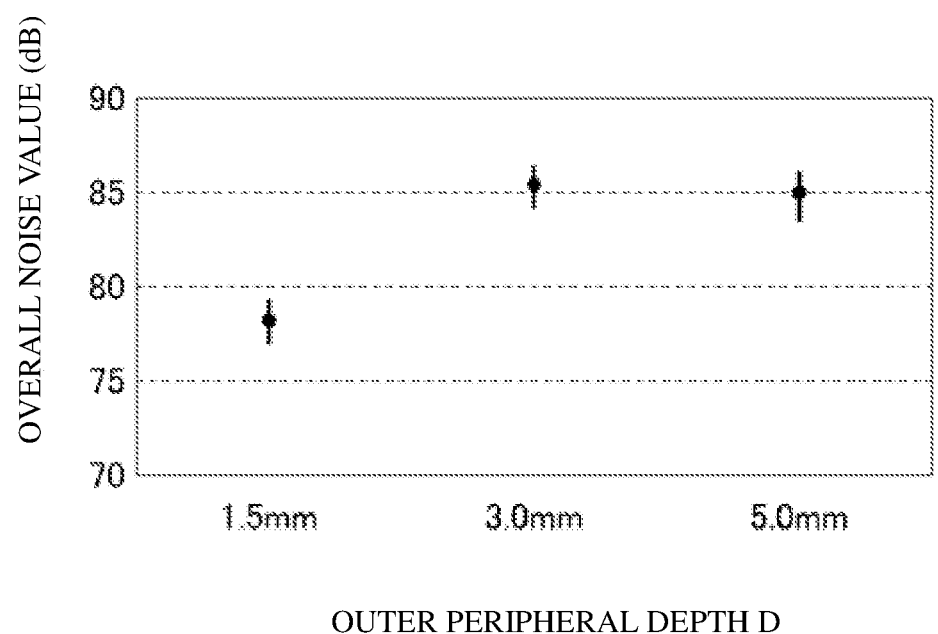
FIG. 8 is a chart illustrating the results of a noise test in which a depth D was changed.

As indicated by the test results shown in FIG. 8, the overall tendency was that as the depth D was increased, the noise increased, and that while a satisfactory noise reduction effect was obtained at 1.5 mm, the noise sharply increased at 3.0 mm Thus, it can be considered that the upper limit of the optimum range of the depth D is 1.5 mm Since any protrusion of the outer peripheral surface 28a of the flat attachment 28 from the outer peripheral surface 14a of the core 14 should be avoided to prevent interference with the field magnet, the optimum range of the depth D can be identified as being 0 (flush) to 1.5 mm.

In the brushed motor 1 of the present embodiment, the ratio Lf/Lc is set at 98% and the depth D is set at 0.4 mm, thus satisfying both optimum range conditions. Accordingly, the above-described noise reduction effect can be obtained.

In the brushed motor 1 of the present embodiment, the flat attachment 28 separately fabricated from the core 14 is inserted and fixed into the slots 16 for the following reasons.

In a conventional brushed motor, the slots 16 opening onto the outer peripheral surface 14a of the core 14 may be filled with adhesive agent. In this case, the outer peripheral surface 14a of the core 14 may be more or less close to being flat in cross sectional shape. However, the filling with adhesive agent is not intended to suppress the wind noise due to the slots 16, but to prevent the windings 17 from sticking out of the slots 16 due to centrifugal force.

Accordingly, the adhesive agent is filled into the central portion of the slots 16 in the direction of the axial line L where the windings 17 tend to stick out. In addition, shrinkage may occur during curing, causing the surface after curing to be greatly recessed from the outer peripheral surface 14a of the core 14. The former may create a cause for failing to meet the condition for the optimum range of the ratio Lf/Lc, and the latter may create a cause for failing to meet the condition for the optimum range of the depth D. As a result, the adhesive agent filled into the slots 16 may fail to contribute to the suppression of the wind noise, thereby failing to obtain the noise reduction effect of the embodiment described with reference to FIG. 6.

In the case of adhesive agent, it may be possible to satisfy the conditions for the optimum ranges of the ratio Lf/Lc and the depth D by repeating the filling and curing. However, this would be very cumbersome and time-consuming, and can hardly be considered practical in terms of yield or manufacturing cost.

In the brushed motor 1 of the present embodiment, the flat attachment 28 separately fabricated from the core 14 is inserted and fixed into the slots 16, making it possible to satisfy the conditions for the optimum ranges of both the ratio Lf/Lc and the depth D. In other words, the outer peripheral surface 14a of the core 14 can be shaped into a flat cross sectional shape suitable for suppression of wind noise, thus making it possible to obtain the noise reduction effect as described above.

In addition, similarly to the adhesive agent, the flat attachment 28 with which the opening of the slots 16 is closed also provides the function of preventing the windings 17 from sticking out of the slots 16. Furthermore, the flat attachment 28 extends substantially throughout the slots 16 in the direction of the axial line L, rather than disposed only at the central portion in the direction of the axial line L as in the case of the adhesive agent. Accordingly, the flat attachment 28 provides the additional effect of more reliably preventing the sticking-out of the windings 17.

The optimum ranges of the ratio Lf/Lc and the depth D are not limited to the above settings. Because the wind noise due to the slots 16 may vary depending on the circumferential velocity of the rotor 7 or the width of the slots 16, for example, the optimum ranges of the ratio Lf/Lc and the depth D may be modified in accordance with such requirements.

In the brushed motor 1 of the present embodiment, the ridges 28d formed on the inner peripheral surface 28c of the flat attachment 28 are abutted against the windings 17 so that the inclined side surfaces 28b can be engaged with the inclined surfaces 15a of the extending portions of the teeth 15. Thus, positional displacement of the flat attachment 28 is regulated by the elasticity of the ridges 28d, and the flat attachment 28 is held in a predetermined position in the opening of the slots 16. As a result, the outer peripheral surface 14a of the core 14 and the outer peripheral surface 28a of the flat attachment 28 are maintained in a predetermined positional relationship, contributing to even more reliable reduction of noise.

Second Embodiment

A second embodiment of a brushed motor 1 of the present invention will be described.

Figure 9:
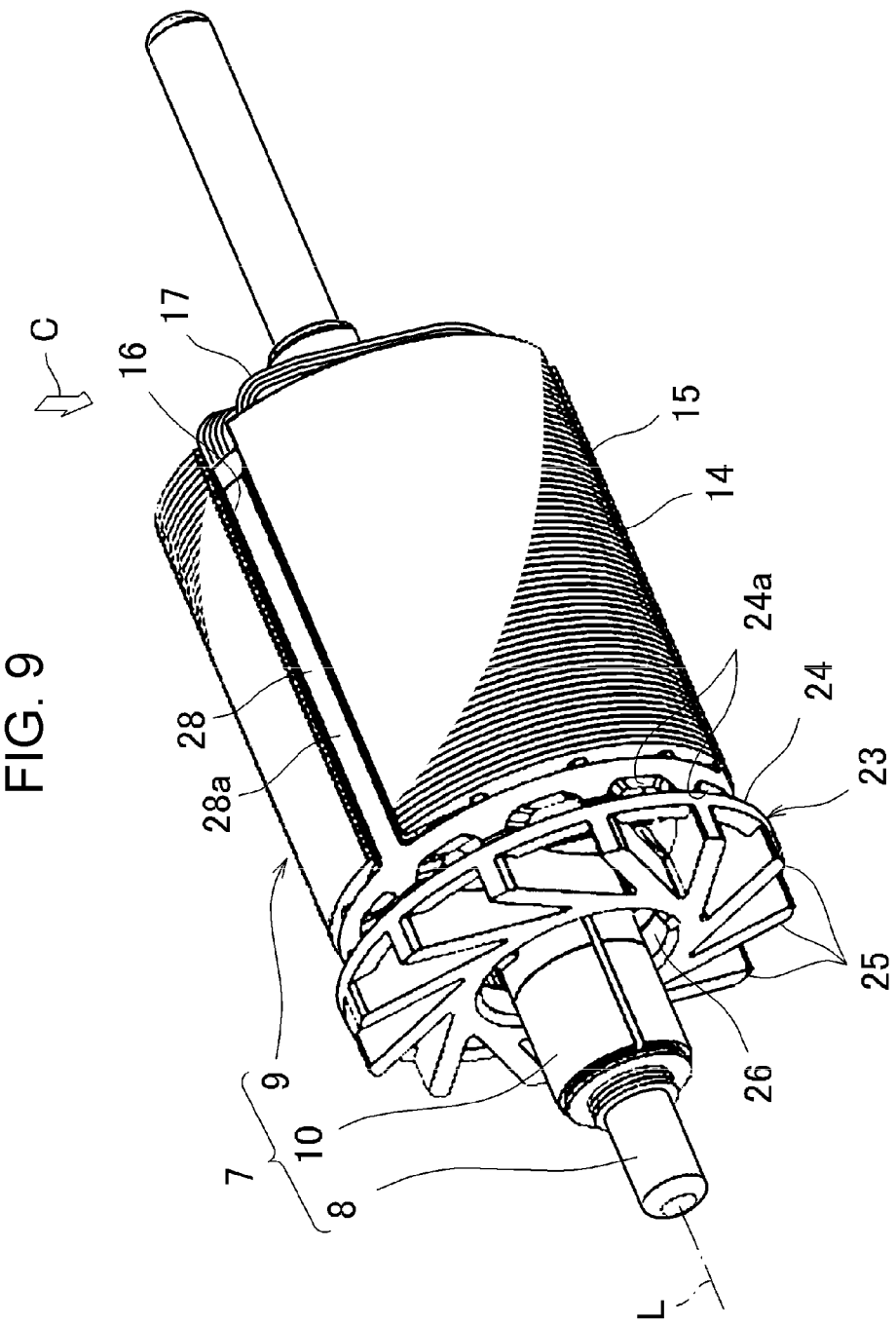
FIG. 9 is a perspective view of a rotor and a cooling fan of a brushed motor according to a second embodiment.

FIG. 9 is a perspective view of a rotor 7 and a cooling fan 23 of the brushed motor 1 of the present embodiment. FIGS. 3 and 4, with reference to which the first embodiment has been described, also illustrate the brushed motor 1 of the present embodiment.

The second embodiment differs from the first embodiment in that flat attachments 28 are formed integrally with the cooling fan 23, and that the cooling fan 23 is supported from the core 14 via the flat attachments 28. Accordingly, parts having common configurations are designated with similar reference signs and their descriptions will be omitted, the following descriptions focusing on the differences.

To the base member 24 of the cooling fan 23, the end (one end) of each flat attachment 28 is connected from the front side. The cooling fan 23 and the flat attachments 28 are integrally formed from synthetic resin material. The positional relationship between the base member 24 and the flat attachments 28 is set such that, with the flat attachments 28 being inserted and fixed into the slots 16 of the core 14 illustrated in FIG. 9, the cooling fan 23 is supported in a regular position as in the first embodiment.

As illustrated in FIG. 4, the rear-side ends of the flat attachments 28 are connected to the base member 24 at positions which are circumferentially aligned with any of the fins 25 of the cooling fan 23.

When the motor 1 is assembled, after the windings 17 are wound on the teeth 15 of the core 14, the flat attachments 28 having adhesive agent applied thereto are inserted into the openings of the respective slots 16 from the rear side along the direction of the axial line L, and are fixedly mounted therein. Consequently, the cooling fan 23 is necessarily disposed in the regular position on the rear side of the core 14, and is supported from the core 14 via the flat attachments 28.

In the first embodiment, it is necessary to insert the flat attachments 28 separately into the slots 16. It is also necessary in the first embodiment to hold the cooling fan 23 in a regular position with respect to the core 14 using a jig and the like, until the adhesive agent for the cooling fan 23 cures. Thus, the assembly operation in the first embodiment may be cumbersome. On the other hand, in the present embodiment, it is possible to insert and fix the flat attachments 28 integrated by means of the cooling fan 23 into the slots 16 at once, while the cooling fan 23 is supported in the regular position. Thus, the assembly operation is greatly simplified and the manufacturing cost is decreased.

In the configuration of the present embodiment, rotation of the rotor 7 is transmitted to the cooling fan 23 via the flat attachments 28. Accordingly, if the rotation of the rotor 7 is sharply changed, the connecting portions between the flat attachments 28 and the cooling fan 23 may experience a large force. In the present embodiment, the ends of the flat attachments 28 are circumferentially aligned with any of the fins 25 of the cooling fan 23, so that the flat attachments 28 and the fins 25 are directly connected across the base member 24.

As a result, the flat attachments 28, the base member 24, and the fins 25 together function as a single stiff body continuous in the direction of the axial line L, making it possible to reliably transmit the rotation of the rotor 7 to the cooling fan 23 without damage. Thus, the durability and reliability of the motor 1 are greatly improved.

While the embodiments have been described, the present invention is not limited to the embodiments. In the foregoing embodiments, the stator 6 have two poles, the armature 9 have three poles, and the brushed motor 1 is provided with the cooling fan 23. However, the specifications of the brushed motor are not limited to the embodiments, and the number of the poles and the like of the stator 6 or the armature 9 may be modified as appropriate. When the flat attachments 28 of the first embodiment are implemented, the cooling fan 23 may be omitted unless any temperatures problems are encountered.

Figure 10:
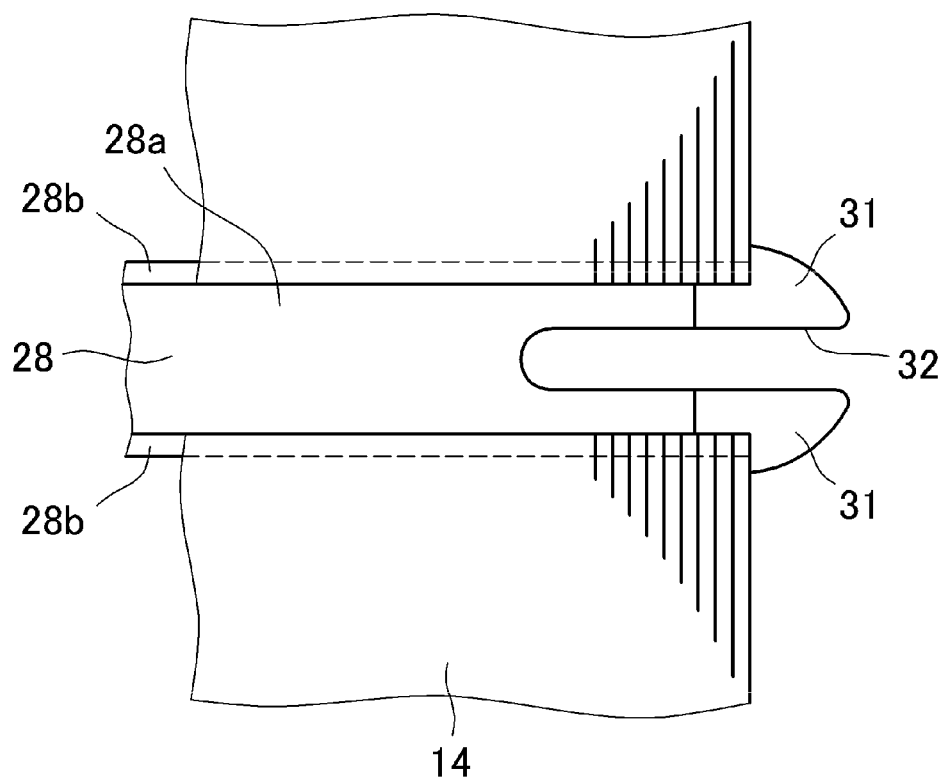
FIG. 10 is a view along arrow C of FIG. 9, illustrating another example in which a hook is formed at the distal end of a flat spacer.

In the foregoing embodiments, the flat attachments 28 are inserted into the openings in the slots 16 and fixed to the core 14 and/or the windings 17 using adhesive agent. However, the method for vising the flat attachments 28 is not limited to the above. FIG. 10 is a view along arrow C of FIG. 9, illustrating another example based on the configuration of the second embodiment. As illustrated, hooks 31 may be formed at the distal end of the flat attachment 28, and the hooks 31 are formed with a longitudinal groove 32 for elasticity.

When the flat attachment 28 is inserted into the slot 16, the hooks 31 are bent toward each other. As the insertion is completed, the hooks 31 elastically recover and become hooked on the end face of the core 14. Because the core 14 is sandwiched between the hooks 31 and the cooling fan 23, it is possible to fix both the cooling fan 23 and the flat attachments 28 in regular positions with respect to the core 14. The need for applying adhesive agent or the like to the flat attachments 28 as in the second embodiment is eliminated, and it is not necessary to wait until the adhesive agent cures. Accordingly, the assembly operation can be even more simplified.

What is claimed is:

1. A brushed motor comprising:
a housing;
a field magnet disposed on an inner peripheral surface of the housing;
a rotor including a core, a rotary shaft rotatably supported in the housing, and a commutator disposed on the rotary shaft, the core having a plurality of teeth circumferentially arranged about an axial line of the rotary shaft, and a slot formed between the teeth, the slot having an opening on an outer peripheral side of the core and extending in an axial line direction of the core, and the rotor further including a winding wound on each of the teeth in the slot;
a brush slidably engaged with an outer peripheral surface of the commutator to supply power to the winding; and
a shape complementing member molded from an insulating material, the shape complementing member being inserted into the opening in the slot of the core from the axial line direction of the core, and fixed therein,
wherein the shape complementing member has an outer peripheral surface which is recessed with respect to an outer peripheral surface of the core in a radius direction of the core about the rotary shaft, the recess having a depth set in a range of from 0 to 1.5 mm.

2. The brushed motor according to claim 1, wherein the slot and the shape complementing member each have a length in the axial line direction of the core along the rotary shaft, and
wherein a ratio of the length of the shape complementing member to the length of the slot is set in a range of from 50 to 100%.

3. The brushed motor according to any one of claim 1, wherein, in the slot, the shape complementing member is engaged with the winding wound on the teeth so as to be biased in an outer peripheral direction, and is engaged with inner surfaces of the teeth extending on both sides of the opening of the slot.

4. The brushed motor according to any one of claim 1, further comprising a cooling fan having an annular shape about the rotary shaft and disposed at an end in the axial line direction of the core,
wherein the cooling fan is connected with one end of the shape complementing member and integrally formed with the shape complementing member, the cooling fan being supported from the core via the shape complementing member.

5. The brushed motor according to claim 4, wherein:
the cooling fan includes an annular base member and a plurality of fins circumferentially arranged on a side of the base member opposite a side of the base member facing the core; and
the one end of the shape complementing member is connected to the base member at a position circumferentially aligned with one of the fins of the cooling fan.

* * * * *